Dec. 22, 1970 D. S. LO ET AL 3,550,101

OLIGATOMIC MAGNETIC FILM MEMORY

Filed March 3, 1969 4 Sheets-Sheet 1

INVENTORS
DAVID S. LO
HENRY N. OREDSON
ERNEST J. TOROK

BY Kenneth T. Grace

ATTORNEY

United States Patent Office 3,550,101
Patented Dec. 22, 1970

3,550,101
OLIGATOMIC MAGNETIC FILM MEMORY

David S. Lo, Burnsville, Henry N. Oredson, Richfield, and Ernest J. Torok, St. Paul, Minn., assignors to Sperry Rand Corporation, New York, N.Y., a corporation of Delaware Filed Mar. 3, 1969, Ser. No. 803,547
Int. Cl. G11c *11/14*
U.S. Cl. 340—174 15 Claims

ABSTRACT OF THE DISCLOSURE

A method of operating and an apparatus comprising a very compact, bit-organized nondestructive readout (NDRO) randon-access magnetic matrix memory system. The memory system includes a continuous oligatomic ferromagnetic film (a film that is too thin to permit either Bloch walls or cross-tie walls, but does permit Néel walls). The film has the property of uniaxial anisotropy: this property provides an easy axis in the plane of the film along which the film's remanent magnetization may be aligned in either of two opposed information states; and, a hard axis in the plane of the film that is perpendicular to the easy axis. The oligatomic film is further characterized by a high magnetization creep threshold and a high reversible limit $H_R$.

BACKGROUND OF THE INVENTION

The term "oligatomic film" was first used by U. Gradmann [XIV Annual Conference on Magnetism and Magnetic Materials, 1968, paper DB–1, to be published in the April 1969 issue of the Journal of Applied Physics; see also Journal of Applied Physics 39, p. 1379 (1968)] in his discussion of his work on films of a thickness greater than 2 A. (angstroms) and less than 200 A. (The word is from the Greek "olig." meaning few, so oligatomic films are films having a small number of atomic layers.) These oligatomic ferromagnetic films have much different properties than do thicker ones. They are not only too thin to permit Bloch walls (see the table of definitions at the end of this section) they are also too thin to permit cross-tie walls which exist in films 250–1000 A. thick. Only Néel walls exist in oligatomic films. As a result, the particular magnetization creep mechanism which applies to cross-tie walls (see abstracts of XIV Annual Conference on Magnetism and Magnetic Materials, 1968, paper DE–2, to be published in the April 1969 Journal of Applied Physics) does not apply to oligatomic films. Accordingly, the magnetization creep threshold for oligatomic films is considerably greater than that for thicker films in which cross-tie walls exist, or for even thicker films which have Bloch or intermediate walls.

For oligatomic films, the creep threshold is fairly close to but below the rotational switching threshold. Other differences between oligatomic films and thicker films are: in oligatomic films 360° walls can exist [see "360° Wande in magnetischen Schichten" by Feldtkeller and Liesk in Zeit. für Angew Physik 14, pp. 195–199 (1962)] while in thicker films they do not. In films greater than 1000 A. thick, a gyromagnetic phenomenon called "wall streaming" (Journal of Applied Physics 39, pp. 863–864, February 1968) can exist; in such films the creep threshold is lowered when the hard axis drive field pulses have risetimes of less than 20 n-sec. (nanosecond) duration. In oligatomic films this is not the case. In thicker films the magnetization may be rotated back and forth repeatedly only about 30° without causing loss of output signal; in oligatomic films this angle is almost 90°.

In oligatomic films the inventors have observed a very rapid stepwise switching mode which has not been observed in thicker films. Oligatomic films were found to switch under a combination of a 140 mHz. (million cycles per second) hard axis drive field, of an amplitude too small to cause any switching by itself, and an easy axis drive field pulse, of an amplitude ⅔ of the film's coercive force $H_C$ and of 120 n-sec. duration. This switching time of 120 n-sec. is slower than that associated with pure rotational switching, but is considerably faster than that associated with wall motion switching or with magnetization creep (which is wall motion that takes place under a combination of a D.C. easy axis drive field and an oscillating or a pulsed hard axis drive field. A recent review of creep theories is that by Wolfgang Kayser, IEEE. Transactions on Magnetics, volume Mag. 3#2, June 1967, pp. 141–157). The rapid stepwise switching mode observed in oligatomic films is thought by the inventors to be "stray field enhanced sequential rotation": the change of hard axis drive field in the presence of an unchanged easy axis drive field causes a magnetostatic charge to appear on the interdomain walls and this charge gives rise to a magnetic stray field which causes certain unswitched regions of the film to switch rotationally. When the hard axis drive field is reversed, a new charge is built up on both the new and the old interdomain walls, which new charge gives rise to a new stray field which causes more of the film to switch rotationally, and so forth. These newly switched areas appear in the electron microscope as spike domains, much like the domains that are nucleated at the edge of a film by the demagnetizing field. This stepwise stray field enhanced sequential rotational switching of oligatomic films is important because it allows switching at a lower threshold than the rotational threshold, yet at speeds fast enough so that the film switching time is not much slower than the selection time of the associated electronics. For brevity we define this switching mode as "dervish" switching.

The present invention relates to magnetizable memory systems as used in electronic data processing systems, and, in particular, to such memory systems utilizing a thin-ferromagnetic-film as the information storage element. Such films may be fabricated in accordance with the S. M. Rubens Pat. No. 2,900,282 and assembled into three-dimensional memory arrays such as disclosed in the S. M. Rubens et al. Patent No. 3,030,612 and Patent No. 3,155,561. The term "magnetizable" designates a substance having a remanent magnetic flux density that is substantially high, i.e., approaches the flux density at magnetic saturation. Additionally, such films possess the property of uniaxial anisotropy providing an easy axis in the plane of the film along which their remanent magnetization is aligned in a first or a second and opposite direction.

Two publications, "System and Fabrication Techniques for a Solid State Random Access Mass Memory" H. W. Fuller et al., Proceedings of the Intermag Conference, 1964, pages 5–5–1 through 5–5–4, and "Instrument for Observation of Magnetization Vector Position in Thin Magnetic Films" C. J. Bader et al., The Review of Scientific Instruments, volume 33, No. 12, December 1962, pages 1429 through 1435, have disclosed memory systems utilizing a two frequency RF selection scheme for the reading operation of a thin-ferromagnetic-film layer. These publications propose the use of coincident X and Y selection frequencies $f_1$ and $f_2$ whereby the memory element only at the intersection of the selected X and Y lines is concurrently energized by the two RF signals whereby the selected memory element acts as a nonlinear mixing element producing a sum-frequency component of frequency $f_1+f_2$. The phase of the sum-frequency output signal is 0 or $\pi$ radians depending on the informational state of the memory element, i.e., whether or not it stores a "1" or a "0." The phase of the output signal is detected against a reference signal frequency $f_1+f_2$ that is derived from the same signal sources as the read drive fields with the phase detector output being a positive or a negative pulse depending upon the informational state of the memory element.

The Fussell Patent No. 3,418,645 disclosed a word-organized (NDRO) memory that, because it employs ordinary thin films rather than oligatomic films, uses for writing a first large hard axis R.F. drive field, whose amplitude exceeds the rotational limit of the associated (discrete) films in coincidence with a digit easy axis drive field, and uses for nondestructive readout a different second small hard axis drive field whose amplitude does not exceed the rotational limit of the associated films. The result is that in order to switch the magnetization of a small number of associated films, or bits, along a word line that is inductively coupled to a large number of associated films, it is necessary to destroy the information in all the large number of associated films along the word line. In contrast, the oligatomic film memory uses the same hard axis drive field amplitude for NDRO reading and writing. Thus, a single bit associated memory area in the middle of an array of bits can be switched without erasing the information in any neighboring bit; for this reason the oligatomic film memory is called "bit-organized." Because the films described in the Fussell Pat. No. 3,418,645 may contain Bloch walls or cross-tie walls the reversible limit $H_R$ is low; to quote from that patent: "Experience indicates that to insure the coherent restoration of the M vector, the angle of rotation should be less than 20°." In oligatomic films, on the other hand, the corresponding angle is nearly 90°. Another difference between the Fussell Pat. No. 3,418,645 and the present invention lies in the readout method. The former uses phase detection, but in the preferred embodiment of the oligatomic film memory of the present invention (in which very narrow lines are used and the film is continuous to avoid registration problems) the area of the film whose magnetization is switched (i.e., the switched area), is sufficiently smaller than the area sensed, i.e., the memory area, so that the output signal of a memory area does not, in general, change phase after switching. As a result, a reference bit, i.e., a reference area, system is employed. Another advantage of oligatomic films is that their demagnetizing field is very small, permitting very compact storage. From all of the above it is apparent that the present invention is an essentially different combination from the above referenced publications, providing an improved memory system which is very inexpensive, and is especially suitable for very large capacity modules.

DEFINITIONS

*Oligatomic film.*—A film of thickness between 2 A, and 200 A.; a film too thin to permit Bloch walls or cross-tie walls.

*Wall.*—A transition region between domains in which the magnetization changes orientation rapidly with respect to distance between domains. Most walls are narrower than 20,000 A. in thin films.

*Bloch wall.*—A wall in which all magnetic poles are on the surfaces of the film. This type of wall is common in films of thickness greater than 1000 A. (see Journal of Applied Physics, 36, pp. 1394–99, April 1965, FIG. 2).

*Néel wall.*—A wall in which the magnetization is always in the plane of the film, and in which the magnetic poles are found in the interior of the wall and not on the surface. (See Journal of Applied Physics, 36, pp. 1394–1399, April 1965, FIG. 1.)

*Intermediate wall.*—A wall having Bloch and Néel components superposed, having poles in the interior of the wall and on the surface of the wall as well. (See Journal of Applied Physics, 36, pp. 1394–1399, April 1965.)

*Cross-tie wall.*—A wall having alternate Néel wall segments of alternating polarity or sense. These Néel segments are separated by very narrow segments of a Bloch wall, which are called Bloch lines. Every second Bloch line has a cross-tie associated with it; a cross-tie is a short Néel wall segment that runs perpendicular to the main wall. (See Journal of Applied Physics, 29, p. 294 (1958) or Journal of Applied Physics, 30, page 82S, April 1959.)

*Transverse field.*—A field parallel to the hard axis.

*Longitudinal field.*—A field parallel to the easy axis.

*Reversible limit,* $H_R$.—The maximum amplitude of hard axis drive field that after repeated application causes no change in the film's remanent magnetic state; the intersection of the magnetization creep threshold with the hard axis drive field axis. (Refer to FIG. 3.)

*Easy axis.*—An axis in the plane of the film such that the magnetization vector is at the lowest energy state when lying parallel to that axis. The films are carefully deposited in the presence of a magnetic field, and the direction of that field during deposition determines (with slight local deviations) the easy axis direction.

*Hard axis.*—An axis in the plane of the film such that the magnetization (always in the plane of the film) is at the highest (saturated) energy state when lying parallel to that axis (see preceding definition). The hard axis for the films discussed here are always 90° from the easy axis.

*Anisotropy field.*—A ferromagnetic film is in the lowest energy state when the magnetization vector is (in the plane of the film) pointed parallel or antiparallel to the easy direction. The magnetization can be rotated into the hard direction which is also in the plane of the film but at 90° to the easy direction; the applied field in oersteds needed to rotate the average magnetization to the hard direction is the anisotropy field plus the demagnetizing field.

*Coercive field,* $H_C$.—The coercive field is the applied field in the easy direction, antiparallel to the magnetization, necessary to switch half the film in the maximum remanent state (reverse half the magnetization) by motion of domain walls.

*Switching threshold.*—The locus of applied field necessary to cause switching to take place. There are four switching thresholds: the rotational threshold, the wall motion threshold, the creep threshold and the dervish switching threshold.

*Rotational switching.*—The switching process in which the magnetization vector in all parts of the film rotates coherently and homogeneously to the opposite direction. This is the fastest mode of switching. (Refer to FIG. 3).

*Wall motion.*—If different parts of the film are magnetized in different directions, they are separated by a wall which is a region in which the magnetization changes from one direction to the other in a very short distance. Under the influence of an applied field the wall can move, enlarging one domain and reducing the other. This is wall motion.

*Creep.*—Magnetization creep is a process in which walls are moved by a combination of a D.C. easy axis drive field and a unipolar or bipolar pulsed (or repeated sine wave) hard axis drive field. Creep is a process in which the magnetostatic charge built up on a domain wall by the unequal rotation of the magnetization on either side of the wall contributes a magnetic field that contributes to wall motion.

*Stray field enhanced sequential rotation.*—A switching process faster than creep and wall motion, yet slower than homogeneous rotation; takes place under a combination of an R.F. hard axis drive field and a D.C. easy axis drive field and is thought to be a process wherein the oscillating magnetostatic charges induced on the walls by the unequal rotations of the magnetization on opposite sides of the wall cause an oscillating stray field which when added to the oscillating applied field causes nearby unswitched areas to switch rotationally.

*Dervish switching.*—A short name for stray field enhanced sequential rotation. (See above.)

*Demagnetizing field.*—The field from the poles on the edge of a film or boundary of a domain. This field is called the demagnetizing field because it tends to demagnetize (or partially reverse) the film.

*NDRO.*—Nondestructive readout. The bit can be read out repeatedly without having to be rewritten.

*Bit-selectable or bit-organized.*—A memory is bit-selectable when any bit in the array can be switched ($x$–$y$ selection) without disturbing any of its neighbors.

*Word-organization.*—A memory is word-organized when all bits of a word are organized along a single drive conductor which carries sufficient current when energized in a write cycle to destroy the information on all bits along that conductor.

*Bit.*—A memory area containing a single piece of information.

SUMMARY OF THE INVENTION

The memory element of the present invention includes a magnetically defined area of an (continuous in at least one direction) oligatomic ferromagnetic film, which has uniaxial anisotropy providing an easy axis in the plane of the film along which the film's magnetization may be aligned either parallel or antiparallel to this easy axis. A hard axis exists in the plane of the film and is perpendicular to the easy axis.

Writing is accomplished by applying to a small memory area, which is located at the intersection of a word and a digit line, a combination of two fields: from the word line an AC hard axis drive field of frequency $f$ of an amplitude that is less than the reversible limit $H_R$ of the memory area; from a digit line, a DC easy axis drive field of a magnitude that is less than the coercive force $H_C$ of the memory area. If the magnetization was previously in the state opposite to the direction of the field from the digit line the memory area is switched (remagnetized) to the opposite information state by the stray field enhanced sequential rotation process. The direction of the resulting remanent magnetization depends on the polarity of the DC easy axis drive field. It should be noted that the writing operation is in a two-wire bit-organized mode.

Nondestructive readout is accomplished by applying the same hard axis drive field to the memory area and detecting, on a hard axis aligned sense line, an output signal of frequency $2f$. In the preferred embodiment, both the signal from an interrogated memory area and the signal from a reference area (in which the magnetization is always in the same reference information state) is fed to a tuned differential sense amplifier. If the interrogated memory area is in the same information state as the reference area, the output of the differential amplifier is zero, so we define the interrogated memory area as being in a "0" state. If the interrogated memory area is in the opposite information state, the output of the tuned differential sense amplifier is not zero, and we define the interrogated memory area as being in the "1" state. Note: if low level gates are used on the memory area and reference area sense lines, the number of reference area sense lines and the number of sense amplifiers can be much less than the number of memory area sense lines.

DESCRIPTION OF THE PREFERRED EMBODIMENTS

Figure 1:
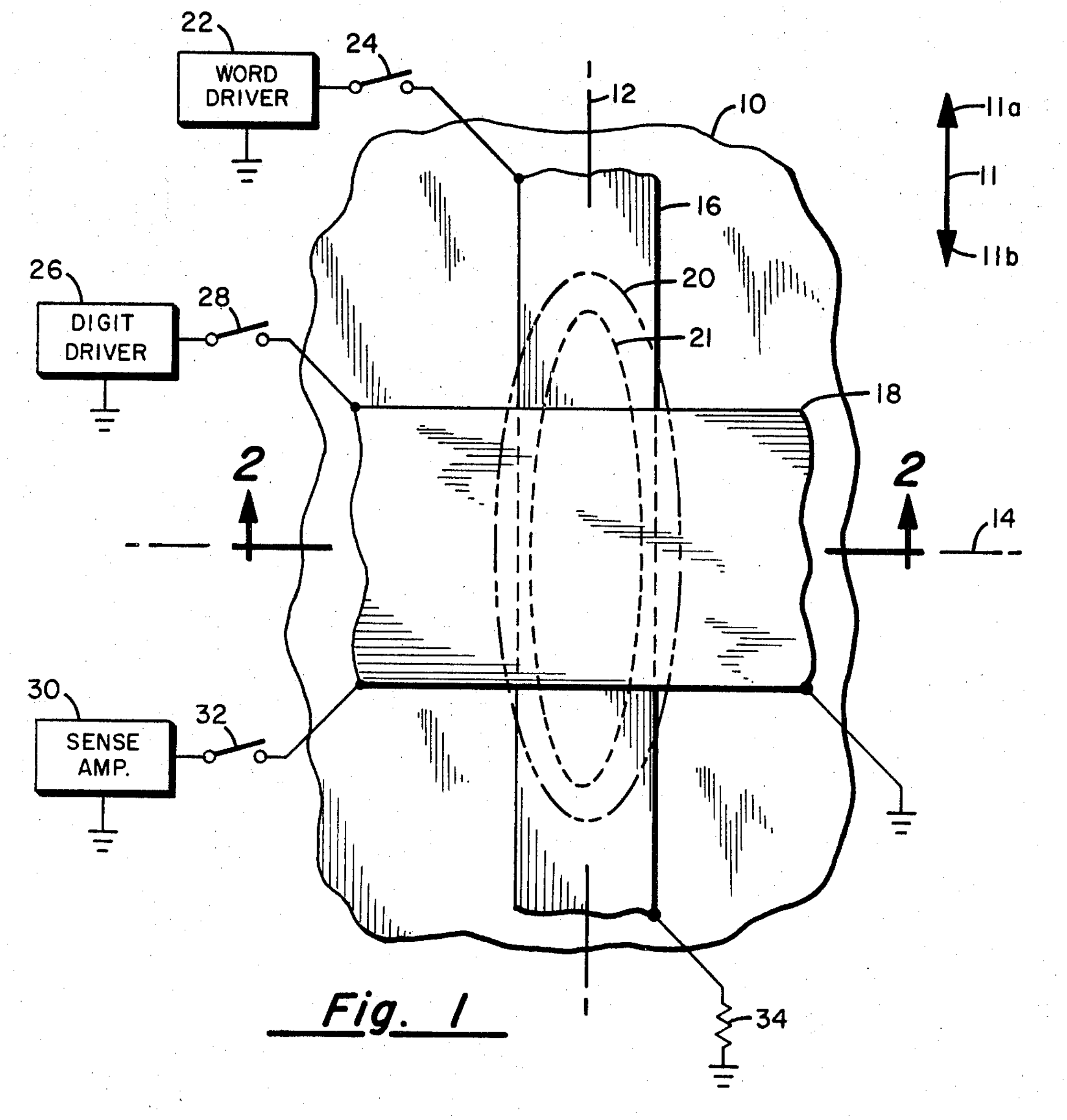
FIG. 1 is an illustration of a preferred embodiment of the present invention.

With particular reference to FIG. 1 there is presented an illustration of a preferred embodiment of the present invention. The preferred embodiment of the present invention utilizes, for the storage medium, a continuous thin-ferromagnetic-film layer 10 of approximately 81% Ni-19% Fe of a thickness of, e.g., 100 A. The thickness of layer 10 is limited to such small thickness (in the order of 50 A. to 250 A.) that it is insufficient to permit interdomain Bloch walls or cross-tie walls and has the property of uniaxial anisotropy providing an easy axis 11 in the plane of layer 10 that is parallel to axis 12. Orthogonal to axis 12, and in the plane of layer 10, is an axis 14 which, as well-known, is parallel to the hard axis of layer 10. Inductively coupled to layer 10 is a word line 16 whose longitudinal axis is parallel to axis 12. Inductively coupled to layer 10 and sandwiching drive line 16 therebetween is a digit-sense line 18 whose longitudinal axis is parallel to axis 14. When source 22, by means of switch 24, couples the appropriate current signal to drive line 16 there is generated about drive line 16 an AC drive field of a frequency $f$ of an intensity in the area of memory area 20 that is less than the reversible limit $H_R$ of memory area 20, which AC drive field is directed transverse the easy axis of layer 10. Accordingly, the drive field generated by an energized drive line 16 may be termed a hard axis drive field. When source 26, by means of switch 28, couples an appropriate current signal to drive line 18 there is generated in the area of memory area 20 a DC drive field of a first or of a second and opposite polarity oriented parallel to the easy axis of layer 10, and which in the area of memory area 20 has an intensity that is less than the coercive force $H_C$ of memory area 20. Accordingly, the drive field generated by an energized drive line 18 may be termed an easy axis drive field.

Initially, layer 10 is saturated throughout its planar dimensions in a given direction along its easy axis 11; for purposes of the present discussion assume that the magnetization of layer 10 is initially oriented along its easy axis 11 in an upward direction as noted by vector 11*a*. When the AC hard axis drive field, from drive line 16, and the first polarity DC easy axis drive field, from drive line 18, are concurrently coupled to memory area 20 the first polarity DC easy axis drive field remagnetizes, or switches, the magnetization of switched area 21 setting its magnetization in a downward direction along its easy axis as noted by vector 11*b*. Alternatively, when the AC hard axis drive field and the second polarity, opposite to the first polarity, DC easy axis drive field are concurrently coupled to memory area 20 the magnetization of memory area 20 is not remagnetized, or switched, the magnetization thereof remaining in its initial upward direction as noted by vector 11*a*.

Due to the magnetization of layer 10 surrounding memory area 20, the switching effect of the coincident application of the AC hard axis drive field and the first polarity DC easy axis drive field is such that the size of the switching area 21 is smaller than the size of the memory area 20. This difference in size produces upon readout of a stored "1" and a stored "0" a difference in amplitude of output signal.

Coupled to digit-sense line 18, by means of switch 32, is tuned sense amplifier 30, which is tuned to twice the frequency, $2f$, of the frequency, $f$, of the hard axis drive field provided by source 22 and drive line 16. Additionally, coupled to drive line 16 is a terminating impedance 34 of magnitude somewhat less than the characteristic impedance of the stripline 16 in order that the current in line 16 be uniform over its length.

Figure 2:
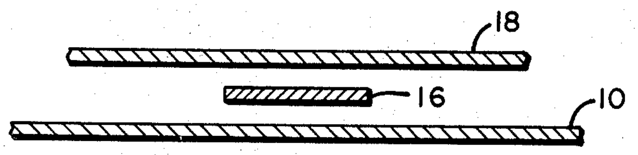
FIG. 2 is an illustration of a cross-section of the memory element of FIG. 1 taken along line 2—2.

With particular reference to FIG. 2 there is presented a cross-section of the embodiment of FIG. 1 taken along line 2—2 thereof. This view is taken to particularly illustrate the stacked, superposed relationship of layer 10, drive line 16 and drive line 18. In consideration of typical dimensions of the elements of the embodiment of FIG. 1 it is to be appreciated that FIG. 2 does not attempt to illustrate relative dimensions of the component parts. Additionally, it is to be noted that only the working elements thereof are illustrated; it being appreciated that other components, such as a substrate member for layer 10 and insulating layers between layer 10, drive line 16 and drive line 18, are necessary for a working embodiment.

To provide an idea of typical dimensions involved, a typical embodiment may include:

Substrate member—SiO covered replicated copper

Layer 10—200 A. thick;

Layer 10—200 A. thick;

Drive line 16—copper strip, 0.0015 inch wide and 0.0002 inch thick;

Drive line 18—copper strip, 0.004 inch wide and 0.0002 inch thick;

Insulation: 0.0005 inch thick Mylar (polyethylene terephthalate) sheet.

The various parts are then assembled into the final memory plane by a suitable adhesive material.

Figure 3:
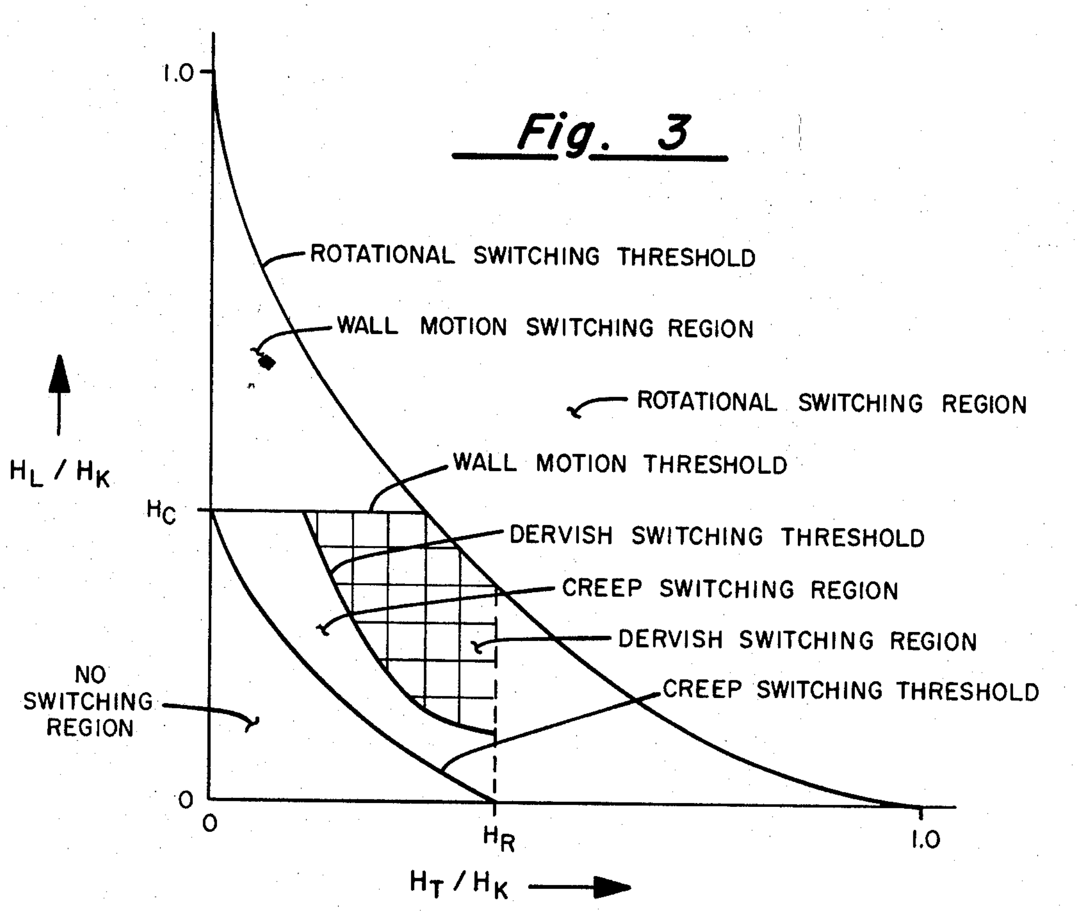
FIG. 3 is an illustration of a portion of the switching astroid of the memory area of FIG. 1.

Prior to discussing, in detail, the operation of the embodiment of FIG. 1, reference must be had to FIG. 3. In order to understand the switching mechanism involved in the operation of layer 10 when driven by sources 22, 26 there is presented in FIG. 3 an illustration of a portion of the switching astroid of the switched area 21 of FIG. 1. FIG. 3 illustrates in graphic form the switching characteristics of switched area 21 of layer 10 when subjected to hard axis, i.e., transverse, drive field $H_T$ and/or easy axis, i.e., longitudinal, drive field $H_L$. The definitions of such switching characteristics are well-known, and, accordingly, no detailed discussion thereof shall be provided herein. However, if background information is required recourse may be had to the text "Amplifier and Memory Devices: With Films and Diodes" N. S. Prywess, Editor, McGraw-Hill Book Company, 1965, Chapter 13, pages 225–244 particularly FIGS. 13–14, page 231. When drawn in all four quadrants, as will be discussed with particular reference to FIG. 4, such switching characteristic is termed a switching astroid.

The various thresholds and switching areas noted in FIG. 3 are believed to be self-explanatory. As respect the present invention, the pertinent areas are:

(a) "No switching region"—the area bounded by the creep switching threshold (and the $H_L$ axis and the $H_T$ axis).

(b) "Creep switching region"—the area bounded by the creep switching threshold, the wall motion threshold and the dervish switching threshold (and the $H_T$ axis).

(c) "Dervish switching region"—the area bounded by the dervish switching threshold, the wall motion threshold and the rotational switching threshold.

With particular respect to FIG. 3 the following terms and their definitions apply:

(a) $H_L$—easy axis drive field, the drive field in the plane of layer 10 that is oriented substantially parallel to, i.e., longitudinal, to the layer's easy axis.

(b) $H_T$—hard axis drive field, the drive field in the plane of layer 10 that is oriented substantially orthogonal to, i.e., transverse, to the layer's easy axis.

(c) $H_C$—coercive force, the drive field in the plane of layer 10 that is oriented substantially anti-parallel, i.e., oppositely aligned, to the layer's remanent magnetization along its easy axis, the amplitude of which is necessary to switch one-half the layer's magnetization by wall motion switching.

(d) $H_K$—anisotropy field; the layer 10 is in its lowest energy state when the layer's magnetization vector is (in the plane of the layer) aligned in a first or a second and opposite direction along the layer's easy axis. The layer's magnetization can be rotated, in the plane of the layer, into substantial alignment with its hard axis which is orthogonal to the layer's easy axis; the drive field in oersteds (oe.) necessary to rotate the layer's average magnetization vector into alignment with the layer's hard axis is the anisotropy field plus the demagnetizing field.

(e) $H_D$—demagnetizing field; the field generated by the free poles on the edge of layer 10 or a boundary of a domain within the layer. This field is called the demagnetizing field because it tends to demagnetize, or partially reverse, the layer's magnetization.

(f) $H_R$—reversible limit; the maximum intensity in the area of layer 10, of the hard axis drive field $H_T$ that after repeated application causes no substantial irreversible switching of the layer's magnetization.

Figure 4:
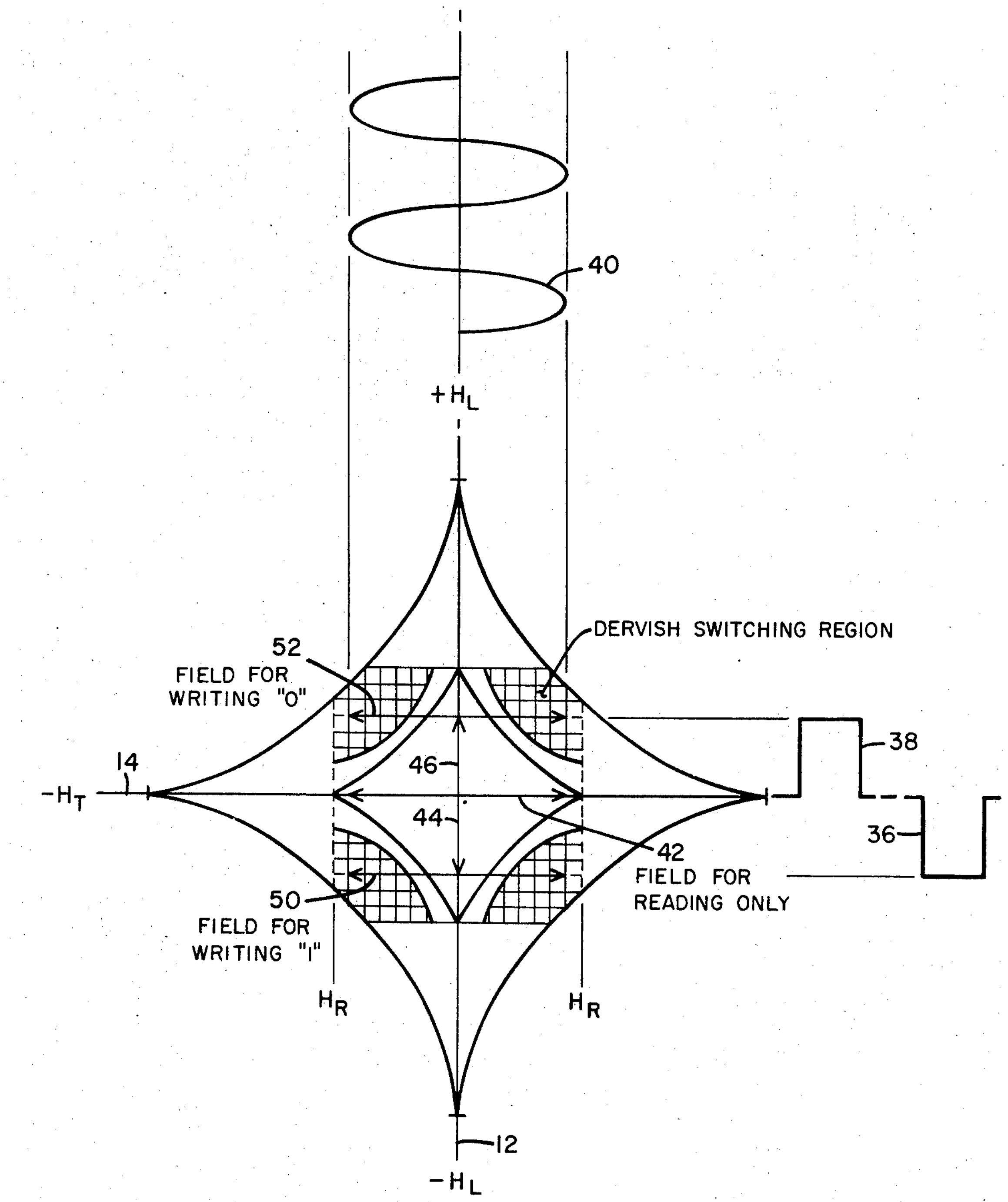
FIG. 4 is an illustration of the memory areas switching astroid and the associated drive fields.

With particular reference to FIG. 4 there is presented an illustration of the switching astroid of switched area 21 of FIG. 1 and the associated drive fields. As noted hereinabove, the memory element of the present invention utilizes for the storage medium a continuous thin-ferromagnetic-film layer of insufficient thickness to permit interdomain Bloch walls or cross-tie walls, and has the property of uniaxial anisotropy providing an easy axis 11, parallel to axis 12, in the plane of layer 10, along which the remanent magnetization thereof shall lie in a first or a second and opposite direction. A word line inductively coupled to layer 10 with its longitudinal axis oriented substantially parallel to the layer's easy axis and a digit-sense line inductively coupled to layer 10 with its longitudinal axis oriented substantially orthogonal to the layer's easy axis form an intersection, with a memory area 20 and a switched area 21, in layer 10, associated with the intersection.

For the write operation, source 22, by means of switch 24, see FIG. 1, couples an appropriate current signal to drive line 16 whereby there is generated about drive line 16 an AC hard axis drive field $H_T$ of a frequency $f$ of an intensity in the area of memory area 20 that is less than the reversible limit $H_R$ of memory area 20. AC hard axis drive field 40, see FIG. 4, is of a sinusoidal form having a preferred frequency $f$ in the range of 10 to 1000 mHz. AC hard axis drive field 40 is schematically illustrated along the $H_T$ axis by bidirectional vector 42. As noted above, the maximum intensity of AC hard axis drive field 40, as depicted by bidirectional vector 42, is limited to an intensity in the area of memory area 20 that is less than its reversible limit $H_R$.

Concurrently with the coupling of the AC hard axis drive field 40 to memory area 20, source 26, by means of switch 28, couples an appropriate current signal 36 or 38 to drive line 18 generating in the area of memory area 20 a DC easy axis drive field $H_L$ of a first or of a second and opposite polarity oriented parallel to the easy axis 11 of layer 10. This DC easy axis drive field has, in the area of memory area 20, an intensity that is less than the coercive force $H_C$ of memory area 20, and may be a constant DC amplitude or a burst of shorter duration pulses, each pulse in the range of 10 ns. to 10 $\mu$s. (microseconds) pulse duration; the burst of shorter duration pulses slightly increases the switched area 21 for a given DC easy axis drive field amplitude. These first and second and opposite polarity DC easy axis drive fields are schematically illustrated by vectors 44 and 46, respectively, and are oriented substantially parallel to axis 12, and, accordingly, the easy axis 11 of layer 10. The intensities of the DC easy axis drive field and the AC hard axis drive field are selected such that they form in the area of memory area 20 a combined drive field that has a positive and a negative maximum intensity that lies in the dervish switching region of the switching astroid of switched area 21. The locus of the tip of the resultant of the drive fields, schematically illustrated bidirectional vector 50 which is generated by vectors 42 and 44, and bidirectional vector 52 which is generated by vectors 42 and 46, set the magnetization of switched area 21 into a first or a second and opposite direction along the layer's easy axis 11. This remagnetization of switched area 21 is accomplished in the dervish switching mode having a final polarization along easy axis 11 that is in accordance with the polarity of the DC easy axis drive fields; e.g., vectors 44 or 46 for the writing of a "1" or "0," respectively, in memory area 20.

For the read operation, source 22, by means of switch 24, again couples its appropriate current signal to drive line 16 wherein there is again generated about drive line 16 the AC hard axis drive field $H_T$ as used in the write operation. This AC hard axis drive field, schematically illustrated by bidirectional vector 42, inductively coupled to memory area 20, causes the magnetization of memory area 20 to generate in drive line 18 an AC output signal of a frequency $2f$. Tuned sense amplifier 30 when coupled to drive line 18 by means of switch 32 detects its output signal as being representative of the informational state of memory area 20.

When the reverse domain, switched area 21, has been written in layer 10, memory area 20 is said to be in a "1" information state. When no reverse domain exists, then memory area 20 is said to be in a "0" information state. The area sensed, memory area 20, has been found to be larger than the area switched, switched area 21, so the output of memory area 20 in a "1" information state is smaller in amplitude than that of a "0" information state; if the area switched, i.e., switched area 21, is more than half the area sensed, i.e., memory area 20, the output signal will be different in phase as well. This difference in amplitude is indicative of the informational content of the interrogated memory area 20. Because the output signal of the saturated state (a "0" information state with no reverse domain) is more repeatable than that of the "1" information state, a tuned differential amplifier may be used, as in FIG. 5, to amplify the difference in output signal amplitude between the interrogated memory area and a reference area which is always in a saturated (or "0") information state.

Figure 5:
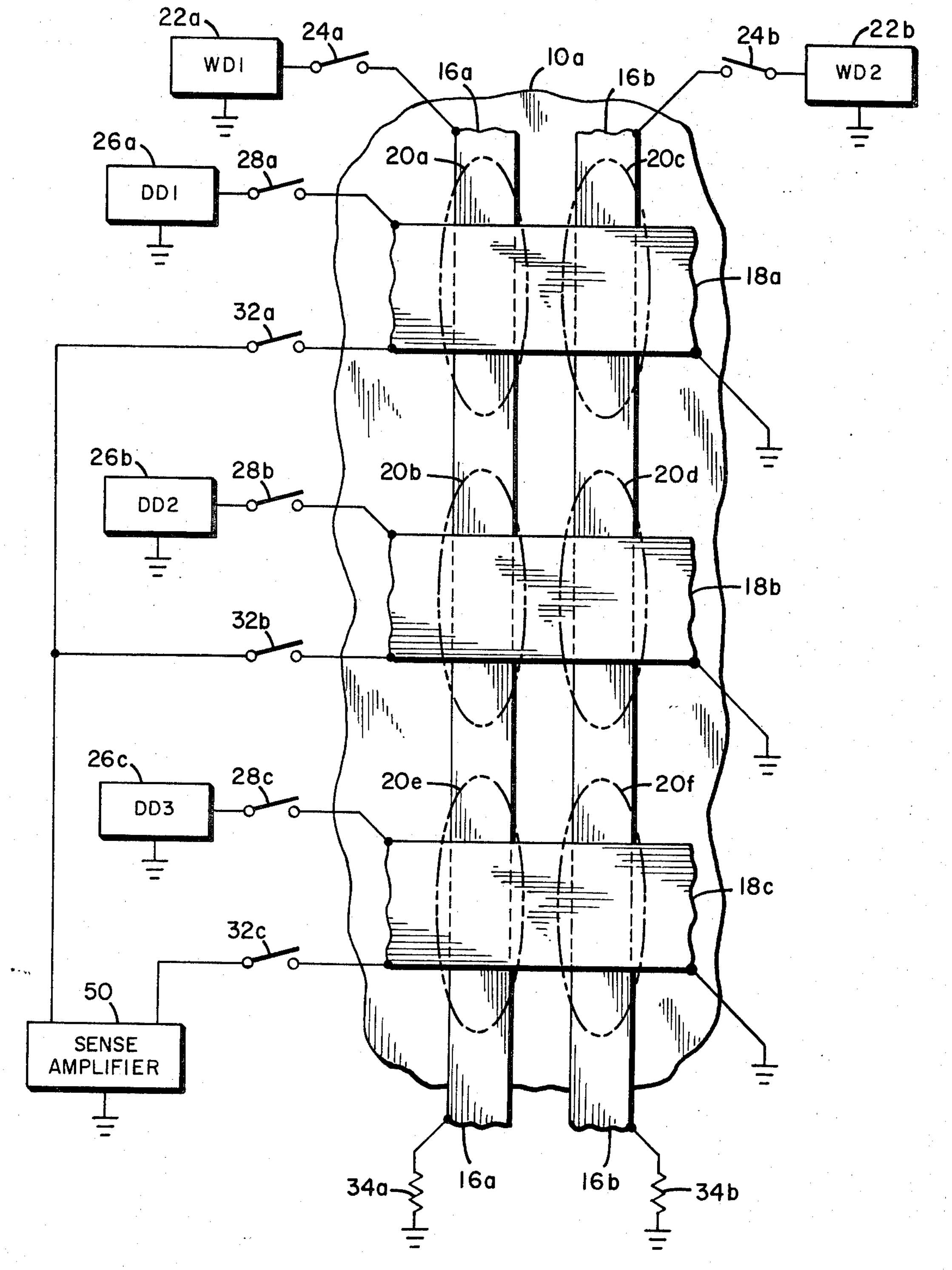
FIG. 5 is an illustration of a 2-word, 2-bit per word memory system incorporating the present invention.

With particular reference to FIG. 5 there is presented an illustration of a 2-word, 2-bit per word memory system incorporating the present invention with like components of FIG. 1 having like reference numbers followed by the appropriate letter suffix. This memory system is operated in a manner similar to that previously discussed with particular reference to FIG. 1. In this embodiment, a plurality of word lines 16*a*, 16*b* are inductively coupled to layer 10*a* with their longitudinal axes oriented substantially parallel to the layer's easy axis 11*a*. Additionally, a plurality of digit-sense lines 18*a*, 18*b*, 18*c* are inductively coupled to the layer 10*a* with their longitudinal axes oriented substantially orthogonal to the layer's easy axis. The word lines 16*a*, 16*b* and the digit-sense lines 18*a*, 18*b*, 18*c* form a plurality of intersections with a memory area 20*a*, 20*b*, 20*c*, 20*d*, and a reference area 20*e*, 20*f* in the layer 10*a* being associated with each intersection. For the reading-out of the information associated with a particular word line, e.g., the memory areas 20*a*, 20*b* representing the 2-bits of the 2-bit word associated with the word drive line 16*a*, source 22*a*, by means of switch 24*a*, couples the appropriate current signal to word drive line 16*a* whereby there is generated about drive line 16*a* the AC hard axis drive field $H_T$ of frequency $f$. Concurrently therewith, a tuned differential sense amplifier 50 by means of their associated switches 32*a*, 32*b*, is selectively coupled to a selected one of digit-sense lines 18*a*, 18*b* whereby the output signals generated by the associated memory areas 20*a*, 20*b* are compared to the output of the reference area 20*e* through the associated switch 32*c*.

When the interrogated memory area 20*a* or 20*b* is in the "0" information, or saturated, state, the difference in output between that and the reference area 20*e*, which is always in the "0" information state, is zero, so that the output of the sense amplifier 50 is insignificant. However, if the interrogated memory area 20*a* or 20*b* is in the "1" information state where a reverse domain of switched area 21 exists, there will be between the outputs of the reference area and the interrogated memory area a substantial difference in amplitude and, if the switched area 21 is large enough, as respects memory area 20, a difference in phase as well, so the resultant output signal from the tuned differential sense amplifier 50 will be large.

For the writing-in of the information associated with a particular word line, e.g., the memory areas 20*a*, 20*b* that are associated with word drive line 16, source 22*a*, by means of switch 24*a*, again couples the appropriate current signal to word drive line 16*a* whereby there is generated about word drive line 16*a* the AC hard axis drive field $H_T$ of frequency $f$ as in the read operation. Concurrently therewith, sources 26*a*, 26*b* by their associated switches 28*a*, 28*b*, couple the appropriate current signal of a first or of a second and opposite polarity to their associated digit-sense lines 18*a*, 18*b*. There is thus generated about digit-sense lines 18*a*, 18*b* a DC easy axis drive field $H_L$ of a first or of a second and opposite polarity oriented parallel to the easy axis 11*a* of layer 10*a*. The remagnetization of the magnetization of memory areas 20*a*, 20*b* is accomplished, as in the operation of FIG. 1, in the dervish switching mode having a final polarization along the easy axis 11*a* of layer 10*a* in accordance with the polarity of the associated DC easy axis drive field.

An inspection of FIG. 4 indicates that both the AC hard axis drive field $H_T$, schematically illustrated by bidirectional vector 42, and the DC easy axis drive fields $H_L$ of a first or of a second and opposite polarity, schematically represented by vectors 44, 46, lie within the "no switching region" of the switching astroid. Accordingly, it is apparent that the memory areas 20*c*, 20*d*, 20*b*, as affected by the AC hard axis drive field $H_T$ schematically represented by vector 42, in the above described write operation undergo no substantial irreversible switching of their remanent magnetization. Likewise, the coupling of the DC easy axis drive field $H_L$, schematically represented by vectors 44, 46, during the above described read operation cause no substantial irreversible switching of the magnetization of memory areas 20*a*, 20*b*, 20*e*. Accordingly, the memory system of FIG. 5 may be described as being bit-oriented providing nondestructive readout (NDRO).

Figure 6:
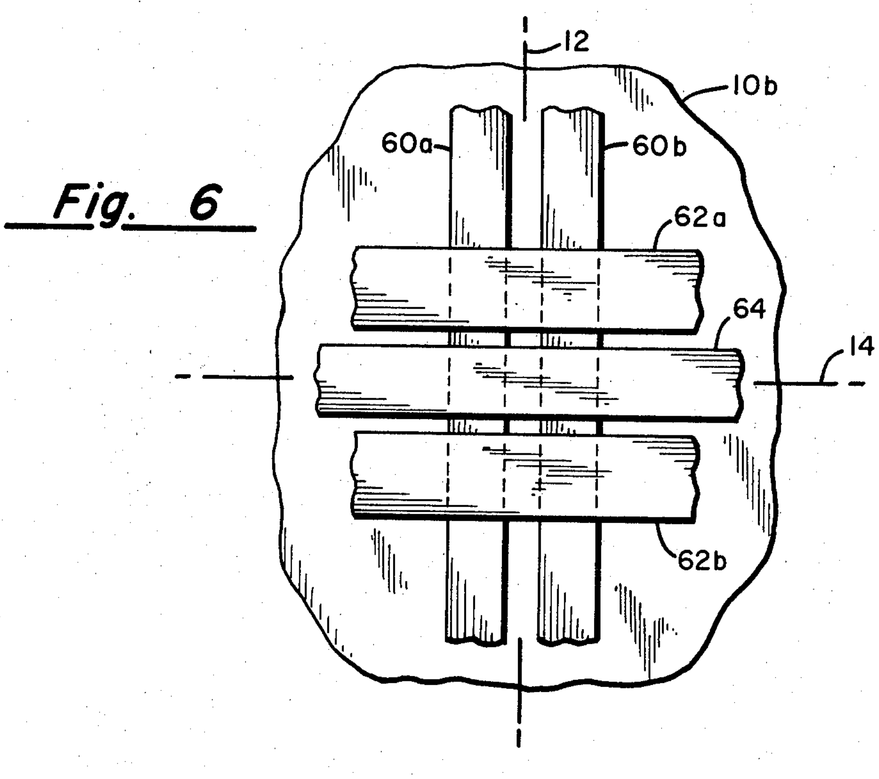
FIG. 6 is an illustration of another embodiment of the present invention.

With particular reference to FIG. 6 there is presented an illustration of another embodiment of the present invention. In this embodiment the hard axis drive field line, analogous to drive line 16 of FIG. 1, is comprised of two portions 60*a*, 60*b* symmetrically oriented about and along axis 12. In this embodiment the digit-sense line, analogous to easy axis drive field line 18 of FIG. 1, is comprised of three electrically isolated portions having their longitudinal axes oriented along and about axis 14. The digit line is comprised of two portions 62*a*, 62*b* separated by sense line 64 oriented therebetween. The forming of the hard axis drive line into two portions 60*a*, 60*b* and the easy axis drive line into two portions 62*a*, 62*b* reduces eddy current losses therein experienced by the drive fields and current signals coupled thereto.

It is apparent that applicants have disclosed herein a preferred embodiment of the present invention that is particularly adapted to the organization of an NDRO bit-organized memory system that is capable of providing a memory module having large number of bits, e.g., in the order of $10^8$ bits, having an extremely high volumetric efficiency. Using the above noted typical dimensions for a typical memory system with the word lines being 0.0015 inch wide on a 0.0030 inch center-to-center spacing and the digit-sense lines being 0.004 inch wide on a 0.008 inch center-to-center spacing there is provided a bit density of 41,625 bits-per-square-inch across the planar dimensions of layer 10. Physically, such a memory system, for example, may be in the order of two square yards of planar area of layer 10; however, it may, alternatively, be folded, being formed of a plurality of similar size memory planes arranged in a stacked, superposed configuration. In consideration of the above it is apparent that the applicants have provided herein a novel, improved memory system.

We claim:

1. A memory system, comprising:
- a continuous thin-ferromagnetic-film having the property of uniaxial anisotropy providing an easy axis along which the remanent magnetization thereof is aligned in a first or a second and opposite direction representative of a first or of a second informational state, respectively, and being of a thickness insufficient to permit the existence of interdomain Bloch walls or cross-tie walls;
- a plurality of word lines inductively coupled to said film and oriented with their longitudinal axes substantially parallel to said easy axis;
- a plurality of digit-sense lines inductively coupled to said film and oriented with their longitudinal axes substantially orthogonal to said easy axis;
- said plurality of digit-sense lines and said plurality of word lines forming a plurality of intersections for locating an associated memory area in said film at each of said intersections;
- word line driver means selectively coupled to said word lines for coupling to a selected word line an AC hard axis drive field of a frequency $f$ and of an intensity in the area of said memory areas that is everywhere less than the reversible limit $H_R$ of said memory areas;
- sense amplifier means selectively coupled to said plurality of digit-sense lines for detecting, from the memory areas affected by said AC hard axis drive field, output signals of a frequency $2f$;
- digit line driver means selectively coupled to said plurality of digit-sense lines for coupling to said digit-sense lines a DC easy axis drive field of a first or of a second and opposite polarity and of an intensity in the area of said memory areas that is less than the coercive force $H_C$ of said memory areas;
- said word line driver means concurrently coupled to said selected word line with said digit line driver means coupled to said plurality of digit-sense lines for concurrently coupling to each of the associated memory areas an associated combined drive field of said AC hard axis drive field and of said DC easy axis drive fields;
- said combined drive field being of a sufficient intensity in said memory area to reverse, in an associated switched area, at least part of the magnetization of its associated memory area;
- the polarity of said DC easy axis drive field setting the said at least part of the magnetization of the associated memory area in a first or a second and opposite direction of remanent magnetization polarization.

2. The memory system of claim 1 wherein said AC hard axis drive field is of a sinusoidal form of a frequency $f$ in the range of 10 mHz. or more.

3. The memory system of claim 2 wherein said DC easy axis drive field is a burst of shorter duration pulses each pulse in the range of 10 ns. to 10$\mu$s. pulse duration.

4. The memory system of claim 1 wherein said digit-sense lines are each comprised of three coplanar strips with the digit line being formed of two strips separated by an electrically isolated sense line therebetween.

5. The memory system of claim 4 wherein said word lines are each comprised of at last two separated strips.

6. The memory system of claim 1 wherein said film is initially set into a first polarity saturated remanent state.

7. The memory system of claim 6 wherein the combined drive field of said AC hard axis drive field and said second polarity DC easy axis drive field affects said film in the associated memory area for switching the magnetization of said switched area within its associated memory area into said second direction of remanent magnetization polarization.

8. The memory system of claim 7 wherein said switched area is less than one-half its associated memory area.

9. The memory system of claim 6 further including a reference sense line inductively coupled to said film and oriented with its longitudinal axis substantially orthogonal said easy axis and forming a plurality of intersections with said plurality of word lines for locating an associated reference area in said film at each of said intersections.

10. The memory system of claim 9 wherein said sense amplifier means includes a tuned differential sense amplifier tuned to an output signal of frequency $2f$ and further including means for selectively coupling said tuned differential sense amplifier across said reference sense line and a selected one of said digit-sense lines.

11. The memory system of claim 1 wherein said combined drive field is of a sufficient intensity to lie in the dervish switching region of its associated switched area.

12. The method of organizing a memory system, comprising:
- forming upon a suitable substrate member a continuous thin-ferromagnetic-film of an insufficient thickness to permit the existence of interdomain Bloch walls or cross-tie walls;
- generating within said film the property of uniaxial anisotropy for providing an easy axis along which the remanent magnetization thereof is aligned in the plane of said film in a first or a second and opposite direction representative of a first or of a second informational state, respectively;
- inductively coupling to said film a plurality of word lines;
- orienting said word lines with their longitudinal axes substantially parallel to said easy axis;
- inductively coupling to said film a plurality of digit-sense lines;
- orienting said digit-sense lines with their longitudinal axes substantially orthogonal to said easy axis;
- forming a plurality of intersections with said word lines and said digit-sense lines;
- forming an associated memory area in said film at each of said intersections;
- associating each memory area along an associated word line with an associated bit of information;
- arranging all the bits of each multibit word stored in the memory system along an associated word line;
- reading out of said memory system by:
  - coupling to a selected one of said word lines an AC hard axis drive field of a frequency $f$ and of an intensity in the area of the associated memory areas that is less thtan the reversible limt $H_R$ of said memory areas;
  - sensing in selected ones of the digit-sense lines associated with the memory areas along said one word line an AC output signal of a frequency $2f$;
- writing into said memory system by:
  - coupling to a selected one of said word lines said AC hard axis drive field;
  - coupling to selected ones of said digit-sense lines a DC easy axis drive field of a first or of a second and opposite polarity and of an intensity in the area of the associated memory areas that is less than the coercive force $H_C$ of said memory areas;
  - generating, by the concurrent coupling of said AC hard axis drive field to said selected word line and of said DC easy axis drive field to said selected digit-sense lines, a combined drive field of a sufficient intensity in said associated memory area to reverse, in an associated switched area, at least part of the magnetization of its associated memory areas;
  - aligning the magnetization of the associated memory areas in said first or second and opposite direction of remanent magnetization polarization as a function of the polarity of said DC easy axis drive field.

13. The method of claim 12 wherein said combined drive field is of a sufficient intensity to lie in the dervish switching region of its associated switched area.

14. The method of claim 13 wherein said AC hard axis drive field is of a sinusoidal form of a frequency $f$ in the range of 10 mHz. or more.

15. The method of claim 13 wherein said DC easy axis drive field is a pulsed signal of a 50% duty cycle in the range of 10 ns. to 10 $\mu$s. duration.

References Cited

UNITED STATES PATENTS

| | | | |
|---|---|---|---|
| 3,371,217 | 2/1968 | Flannery et al. | 307—88 |
| 3,421,153 | 1/1969 | Bartik et al. | 340—174 |

JAMES W. MOFFITT, Primary Examiner